UNITED STATES PATENT OFFICE.

GEORGE LUNT, OF FORMBY, ENGLAND.

MANUFACTURE OF BREAD.

1,044,467.     Specification of Letters Patent.     Patented Nov. 12, 1912.

No Drawing. Original application filed October 30, 1908, Serial No. 460,337. Divided and this application filed May 6, 1910. Serial No. 559,816.

*To all whom it may concern:*

Be it known that I, GEORGE LUNT, a subject of the King of Great Britain and Ireland, and residing at Formby, in the county of Lancaster, England, have invented a certain new and useful Improvement in and Relating to the Manufacture of Bread, of which the following is a specification.

This invention relates to the treatment of dough for the manufacture of bread and has for its object to provide a process whereby the baked products of the treated dough shall be whiter in color and may be of greater volume than those obtained from dough prepared by the methods hitherto known.

This invention consists in subjecting the dough to permeation by oxygen, air or other suitable gas containing free oxygen after the lapse of a part of the period of fermentation in and more particularly in treating dough at such a time by subjecting it to the stretching and aerating effect of compressed free oxygen containing gas of which air is an example. The time of treatment is preferably after the lapse of a quarter or more of the fermentation period. I have found that a very considerable improvement in the whiteness and volume of the baked products of dough is obtained by such treatment an increase in volume of 5% having been observed although it is less advantageous to treat the dough either at too early or at too late a stage of the fermentation period as the full improvement in color and in volume may not then be realized.

In carrying out this invention in one manner the dough which has been allowed to stand after the completion of mixing for a portion of its fermentation period is treated by the method described in my co-pending application Serial No. 460337 filed October 30th 1908. To this end the dough is placed in my apparatus of the type described in the said application which apparatus since it forms no part of the present invention is not described in detail herein. The dough is treated by a free oxygen containing gas such as air which is forced into it by nozzles or equivalent means which only deliver the gas while they are sealed by or immersed within the dough thus insuring the retention within it of the maximum quantity of gas and resulting in a thorough stretching and permeation. This treatment is continued until substantially all the dough has been acted upon when it is allowed to stand for a further period before being placed in the oven. As an example of the prepared form of the process where the period between the completion of mixing and the placing of the dough in the oven is to be about four hours the dough is treated after the lapse of three hours and is allowed to stand for at least half an hour before being placed in the oven after the end of the aeration. It will be understood, however, that as above indicated thorough stretching and permeation of the dough may be effected at any time after the whole of the ingredients have been mixed, but I have found that a marked increase in size of loaf and a decided whitening of the dough occurs if the dough be treated by the process after the lapse of one quarter or more of the period of fermentation. As the introduction of air or gas usually causes a temporary decrease in the volume of the dough itself it is for most purposes preferable to allow the dough to ferment for at least half an hour after the last treatment with air or gas before placing it in the oven so that the dough may regain its former volume and the full increase in volume of the bread realized. It is found that the most marked results are obtained with the lower grades of flour.

I wish it to be understood that the word dough as used herein is intended to refer only to the mass after all the ingredients have been brought together. Further it will be understood that the method of exposing the dough to the action of the gas may be varied in very many ways provided always that the dough at some part of its fermentation period is opened out or subdivided to expose substantially every part of it to the gas and to insure a maximum retention of gas in the dough on recombination.

Having now described my invention what I claim as new and desire to secure by Letters Patent is:—

1. A process for the treatment of dough consisting in exposing the dough during its normal period of fermentation and after the lapse of a part of said period of fermentation to a suitable gas containing free oxygen under pressure.

2. A process for the treatment of dough consisting in subdividing the same after the lapse of a part of and during its normal period of fermentation in a free oxygen containing gaseous atmosphere and recombining the same in this atmosphere, as set forth.

3. A process for the treatment of dough consisting in allowing the dough to rest after complete mixing of its ingredients for a part of its normal period of fermentation and subdividing it in a free oxygen containing gaseous atmosphere under pressure and recombining the dough particles while still in this gaseous atmosphere.

4. A process for the treatment of dough in which the same after standing for a portion of its normal fermentation period is impregnated with a gas containing free oxygen by forcing the same into it under pressure throughout its mass, as set forth.

5. A process for the treatment of dough consisting in permeating the same after the lapse of a part of the normal period of fermentation with a free oxygen containing gas and after the completion of permeation allowing the same to remain undisturbed for a further period before baking; as set forth.

6. A process for the treatment of dough consisting in permeating the same with a suitable gas containing free oxygen after the lapse of at least a quarter of its period of fermentation and after the completion of permeation allowing the dough to remain undisturbed for at least half an hour before baking; as set forth.

7. A process of dough treatment in which dough after standing for at least one quarter of its fermentation period is permeated by a suitable free oxygen containing gas forced into it throughout its mass to effect stretching and aeration and is then allowed to stand substantially undisturbed at least half an hour before baking; as set forth.

8. A process for the treatment of dough for bread in which the whole of the ingredients of the bread are mixed into dough, the dough is then allowed to stand for a portion of the normal period during which dough is allowed to stand before baking and is then permeated with a suitable gas containing free oxygen; as set forth.

9. In the manufacture of bread a process for the treatment of the bread dough in which the same after admixture of its ingredients and after the lapse of a part of its period of fermentation is impregnated with a suitable gas containing free oxygen; as set forth.

In testimony whereof, I affix my signature in presence of two witnesses.

GEORGE LUNT.

Witnesses:
E. CANDELAND,
W. NOWBEN SHERLOCK.